United States Patent
Wu et al.

(10) Patent No.: US 12,223,042 B2
(45) Date of Patent: Feb. 11, 2025

(54) METHOD AND SYSTEM FOR LEAKAGE MEASUREMENT ERROR COMPENSATION BASED ON CLOUD-EDGE COLLABORATIVE COMPUTING

(71) Applicants: Technology Institute of WenzhouUniversityinYueqing, Wenzhou (CN); Wenzhou University, Wenzhou (CN)

(72) Inventors: Ziran Wu, Wenzhou (CN); Guichu Wu, Wenzhou (CN); Zhenquan Lin, Wenzhou (CN); Juntao Yan, Wenzhou (CN); Yuelei Sun, Wenzhou (CN)

(73) Assignees: Wenzhou University, Wenzhou (CN); Technology Institute of Wenzhou University in Yueqing, Wenzhou (CN)

( * ) Notice: Subject to any disclaimer, the term of this patent is extended or adjusted under 35 U.S.C. 154(b) by 233 days.

(21) Appl. No.: 17/828,933

(22) Filed: May 31, 2022

(65) Prior Publication Data
US 2022/0391504 A1    Dec. 8, 2022

(30) Foreign Application Priority Data
Jun. 3, 2021    (CN) .......................... 202110620709.1

(51) Int. Cl.
*G06F 21/55*    (2013.01)
*G06F 18/2413*    (2023.01)
(Continued)

(52) U.S. Cl.
CPC ........ *G06F 21/556* (2013.01); *G06F 18/2414* (2023.01); *G06N 7/023* (2013.01); *G06N 20/20* (2019.01)

(58) Field of Classification Search
CPC .. G06F 21/556; G06F 18/2414; G06F 18/214; G06F 18/23; G06F 2218/10;
(Continued)

(56) References Cited

U.S. PATENT DOCUMENTS

| 9,336,302 B1* | 5/2016 | Swamy ............... G06F 16/2465 |
| 2014/0176336 A1* | 6/2014 | Li .......................... G01R 31/52 340/870.01 |
| 2017/0160338 A1* | 6/2017 | Connor ............ G11C 29/50016 |

FOREIGN PATENT DOCUMENTS

| CN | 111275270 | 6/2020 | ............ H04L 29/08 |

OTHER PUBLICATIONS

Office Action dated May 27, 2022 in China Patent Application No. 202110620709.1, 5 pages.

* cited by examiner

*Primary Examiner* — Bryan F Wright
(74) *Attorney, Agent, or Firm* — Bauer & Joseph

(57) ABSTRACT

A leakage measurement error compensation method based on cloud-edge collaborative computing is implemented on a communication network formed by an interconnection between a leakage current edge monitoring terminal and a power consumption management cloud platform. The method includes the following steps: iteratively training, by the power consumption management cloud platform, a pseudo-leakage compensation model by using the received leakage current data, continuously updating pseudo-leakage model parameters, and feeding the pseudo-leakage model parameters back to the leakage current edge monitoring terminal; and processing, by the leakage current edge monitoring terminal, the leakage current data according to the pseudo-leakage compensation model parameters.

5 Claims, 5 Drawing Sheets

(51) Int. Cl.
*G06N 7/02* (2006.01)
*G06N 20/20* (2019.01)
(58) Field of Classification Search
CPC ........ G06N 7/023; G06N 20/20; G06N 20/00;
G01R 35/005
USPC .......................................................... 726/22
See application file for complete search history.

METHOD AND SYSTEM FOR LEAKAGE MEASUREMENT ERROR COMPENSATION BASED ON CLOUD-EDGE COLLABORATIVE COMPUTING

CROSS REFERENCE TO RELATED APPLICATION

This patent application claims the benefit and priority of Chinese Patent Application No. 202110620709.1, filed on Jun. 3, 2021, the disclosure of which is incorporated by reference herein in its entirety as part of the present application.

TECHNICAL FIELD

The present disclosure relates to the technical field of electrical circuit monitoring, and particularly relates to a leakage measurement error compensation method and system based on cloud-edge collaborative computing.

BACKGROUND ART

With the rapid development of the national economy, China's generating capacity and electricity consumption have jumped to the first place in the world, which has also brought about frequent electrical safety accidents. Most of the locations of electrical fires are in a range from a power distribution terminal to a power consumption terminal in a power system (that is, starting from a low-voltage transformer at a user side, passing through a low-voltage power distribution appliance, and then reaching a user's electrical appliance). This is because power distribution circuits and electrical appliances are often installed and maintained by users, resulting in irregularities in design, installation and use. At the same time, professional maintenance and overhaul cannot be performed after damage occurs during long-term operation. Especially the most important reason is the lack of effective monitoring of circuit states. However, in electrical safety accidents, personal safety and fire accidents caused by the leakage current in circuits account for a very large proportion. Therefore, it is particularly important to monitor the leakage current in the circuits in real time.

At present, a zero sequence current transformer is used to measure the leakage current in the circuits. However, the zero sequence transformer in practical applications has measurement errors due to magnetic leakage, uneven winding and other reasons, resulting in the measured leakage current being significantly larger than the real leakage current in the circuits, which is called a "pseudo-leakage" phenomenon in the industry. The interference of "pseudo-leakage" must be removed in order to accurately obtain the real leakage current closely related to electrical fires.

Theoretically, the magnitude of the leakage current is not affected by the change of a working current. However, in the research, it is found that the "pseudo-leakage" will increase with the increase of the working current, which is caused by the accuracy of the zero sequence transformer and an installation method of cables. For example, the characteristics of different zero sequence transformers are difficult to be completely consistent, making the accuracy inaccurate. For another example, the consistency of cable installation cannot be ensured, which leads to the fact that the distribution modes of real leakage and "pseudo-leakage" are not constant. Therefore, it is necessary to model the pseudo-leakage of each zero sequence transformer respectively by analyzing the monitoring data of each zero sequence transformer. Due to the insufficient computing power of an edge monitoring terminal, the data needs to be uploaded to the cloud platform for modeling calculation, and then, compensation parameters are fed back to the edge terminal for pseudo-leakage compensation.

SUMMARY

The technical problem to be solved by the embodiments of the present disclosure is to provide a leakage measurement error compensation method and system based on cloud-edge collaborative computing, which can eliminate a pseudo-leakage phenomenon generated by a zero sequence current transformer, so as to obtain accurate leakage current data.

In order to solve the above technical problem, the embodiments of the present disclosure provide a leakage measurement error compensation method based on cloud-edge collaborative computing, implemented on a communication network formed by interconnection between a leakage current edge monitoring terminal and a power consumption management cloud platform, and including the following steps:

monitoring, by the leakage current edge monitoring terminal, load voltage, load current and leakage current data, and sending the data to the power consumption management cloud platform;

iteratively training, by the power consumption management cloud platform, a pseudo-leakage compensation model by using the received data, updating pseudo-leakage model parameters, and feeding the pseudo-leakage model parameters back to the leakage current edge monitoring terminal; and processing, by the leakage current edge monitoring terminal, the leakage current data according to the pseudo-leakage compensation model parameters received from the power consumption management cloud platform and by using the same pseudo-leakage compensation model as the power consumption management cloud platform, so as to eliminate the influence of a pseudo-leakage phenomenon in the leakage current data.

The load voltage, load current and leakage current data are collected by a preset sensor from designated circuit nodes.

The pseudo-leakage compensation model is constructed by a Multiple Instance Regression (MIR) algorithm based on Robust Fuzzy Clustering (RFC), and center points and covariances of fuzzy members are gradually optimized in a training process until probabilistic members complete the convergence.

An optimization formula of the fuzzy members is:

$$u_{ij}^F = \left[\sum_{k=1}^{C}\left(\frac{dist_{ij}^2}{dist_{kj}^2}\right)^{\frac{1}{m-1}}\right] - 1,$$

where $$u_{ij}^F \in [0, 1]; \sum_{i=1}^{C} u_{ij}^F = 1; dist_{ij}^2 = \sum_{k=1}^{d+1} v_{ik}[(x_j - c_j) \cdot e_{ik}]^2;$$

C represents a number of clusters; m>1, and represents a fuzzy weight parameter; $x_j$ represents a sample; $c_i$ represents a center of a cluster i; $e_{ik}$ represents a kth characteristic vector of a covariance matrix $$\Sigma_i = \frac{\sum_{j=1}^{N}(u_{ij}^F)^m(x_j - c_i)(x_j - c_i)^T}{\sum_{j=1}^{N}(u_{ij}^F)^m}$$

of the cluster i; and $v_{ik}$ represents a weight coefficient of a characteristic root in the kth characteristic vector.

An updating formula of the probabilistic members is:

$$u_{ij}^P = \frac{1}{1 + \left(\frac{dist_{ij}^2}{\eta_i}\right)^{\frac{1}{m-1}}}.$$

The embodiments of the present disclosure further provide a leakage measurement error compensation system based on cloud-edge collaborative computing, including a leakage current edge monitoring terminal and a power consumption management cloud platform which are interconnected, where the leakage current edge monitoring terminal is used to monitor load voltage, load current and leakage current data and send the data to the power consumption management cloud platform, and uses the same pseudo-leakage compensation model as the power consumption management cloud platform and processes the leakage current data according to the pseudo-leakage compensation model parameters received from the power consumption management cloud platform, so as to eliminate the influence of a pseudo-leakage phenomenon in the leakage current data; and the power consumption management cloud platform uses the received data to iteratively train a pseudo-leakage compensation model, updates pseudo-leakage model parameters, and feeds the pseudo-leakage model parameters back to the leakage current edge monitoring terminal.

The load voltage, load current and leakage current data are collected by a preset sensor from designated circuit nodes.

The pseudo-leakage compensation model is constructed by an MIR algorithm based on RFC, and center points and covariances of fuzzy members are gradually optimized in a training process until probabilistic members complete the convergence.

The embodiments of the present disclosure have the following beneficial effects:

Based on an original storage function of the power consumption management cloud platform, the present disclosure focuses on solving the construction and training problems of complicated models, and model parameter updates are provided for edge computing and fed back to the leakage current edge monitoring terminal, thereby realizing self-adaptive and self-adjusting intelligent closed loop feedback of parameters. As a result, the leakage current edge monitoring terminal processes the data collected by the zero sequence current transformer according to the pseudo-leakage model parameters to complete edge computing compensation, so as to eliminate the influence of a pseudo-leakage phenomenon on a real leakage current, thereby achieving the purpose of eliminating the pseudo-leakage phenomenon generated by the zero sequence current transformer to obtain accurate leakage current data.

BRIEF DESCRIPTION OF THE DRAWINGS

In order to more clearly illustrate the technical solutions in the embodiments of the present disclosure or in the prior art, the drawings required for description in the embodiments or the prior art will be briefly described below. It is apparent that the drawings in the following description are only some embodiments of the present disclosure. Other drawings obtained according to these drawings by those skilled in the art without any creative work still belong to the scope of the present disclosure.

DETAILED DESCRIPTION OF THE EMBODIMENTS

In order to make the objectives, technical solutions and advantages of the present disclosure more clear, the present disclosure will be further described in detail below with reference to the drawings.

Figure 1:
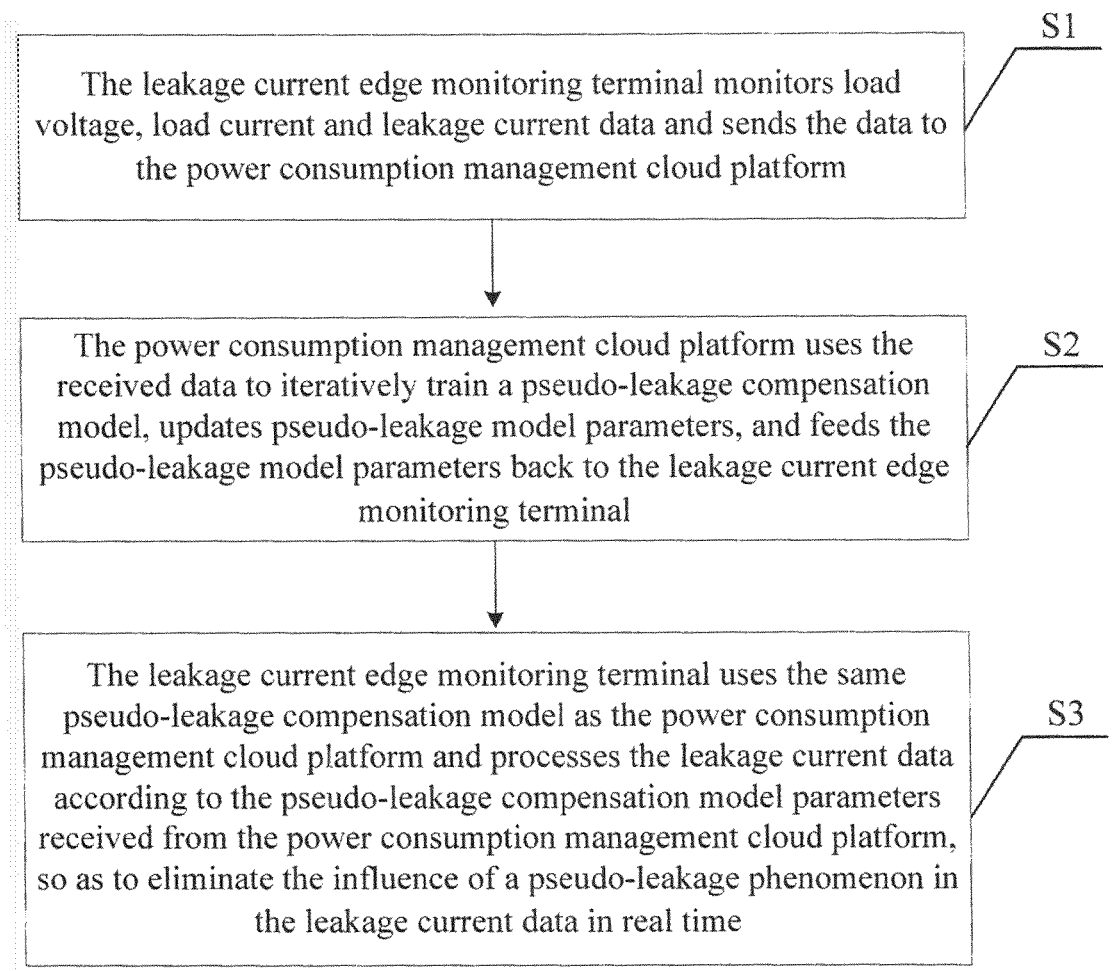
FIG. 1 is a flowchart of a leakage measurement error compensation method based on cloud-edge collaborative computing provided by the embodiments of the present disclosure.

As shown in FIG. 1, a leakage measurement error compensation method based on cloud-edge collaborative computing provided in the embodiments of the present disclosure is implemented on a communication network formed by interconnection between a leakage current edge monitoring terminal and a power consumption management cloud platform, and includes the following steps:

S1: the leakage current edge monitoring terminal monitors load voltage, load current and leakage current data and sends the data to the power consumption management cloud platform;

S2: the power consumption management cloud platform uses the received data to iteratively train a pseudo-leakage compensation model, updates pseudo-leakage model parameters, and feeds the pseudo-leakage model parameters back to the leakage current edge monitoring terminal; and S3: the leakage current edge monitoring terminal uses the same pseudo-leakage compensation model as the power consumption management cloud platform and processes the leakage current data according to the pseudo-leakage compensation model parameters received from the power consumption management cloud platform, so as to eliminate the influence of a pseudo-leakage phenomenon in the leakage current data.

The specific process is that in S1, the leakage current edge monitoring terminal monitors the load voltage, load current and leakage current data collected by a preset sensor from designated circuit nodes, and sends the data to the power consumption management cloud platform through a communication network. It should be noted that a communication standard of the communication network includes, but is not limited to, 5G, 4G, NB-IoT, LoRaWAN, WiFi, Ethernet, and a third-party custom communication standard.

It can be understood that the leakage current edge monitoring terminal and various sensors (including a zero sequence current transformer for monitoring a leakage current) may be integrated or may be separate components.

In S2, the interference removal of the leakage current data in the leakage current edge monitoring terminal needs to separate a real leakage current from a "pseudo-leakage" current, and specific distribution models of the real leakage current and the "pseudo-leakage" current are unknown and need to be judged independently in the accumulation of operating data, so that this problem is an unsupervised adaptive clustering problem. Since the real leakage current and the "pseudo-leakage" current have different distributed models, the above problem may be considered as an MIR problem.

The present disclosure uses an RFC method in the power consumption management cloud platform to realize the MIR problem (Robust Fuzzy Clustering for Multiple Instance Regression, RFC-MIR). That is, a pseudo-leakage compensation model is constructed by an MIR algorithm based on RFC, and center points and covariances of fuzzy members are continuously optimized in a training process until probabilistic members complete the convergence, thereby completing model training.

An optimization formula of fuzzy members is shown in following formula (1):

$$u_{ij}^F = \left[\sum_{k=1}^{C}\left(\frac{dist_{ij}^2}{dist_{kj}^2}\right)^{\frac{1}{m-1}}\right] - 1, \quad (1)$$

where $$u_{ij}^F \in [0, 1]; \sum_{i=1}^{C} u_{ij}^F = 1; dist_{ij}^2 = \sum_{k=1}^{d+1} v_{ik}[(x_j - c_i) \cdot e_{ik}]^2;$$

C represents a number of clusters; m>1, and represents a fuzzy weight parameter; $x_j$ represents a sample; $c_i$ represents a center of a cluster i; $e_{ik}$ represents a kth characteristic vector of a covariance matrix $$\Sigma_i = \frac{\sum_{j=1}^{N}(u_{ij}^F)^m(x_j - c_i)(x_j - c_i)^T}{\sum_{j=1}^{N}(u_{ij}^F)^m}$$

of the cluster i; and $v_{ik}$ represents a weight coefficient of a characteristic root in the kth characteristic vector.

An updating formula of probabilistic members is shown in the following formula (2):

$$u_{ij}^P = \frac{1}{1 + \left(\frac{dist_{ij}^2}{\eta_i}\right)^{\frac{1}{m-1}}}. \quad (2)$$

Firstly, a pseudo-leakage compensation model is constructed in the power consumption management cloud platform; secondly, a circuit sensing database is established in the power consumption management cloud platform, the data uploaded each time by a circuit monitoring unit of each topological node is recorded, the pseudo-leakage compensation model is trained according to the collected historical data, and center points and covariances of fuzzy members are continuously optimized in a training process until probabilistic members complete the convergence to complete model training, thereby obtaining a trained pseudo-leakage compensation model; and finally, the trained pseudo-leakage compensation model is used to process the leakage current data uploaded by the leakage current edge monitoring terminal to obtain pseudo-leakage model parameters, and the pseudo-leakage model parameters are fed back to the leakage current edge monitoring terminal, thereby realizing self-adaptive and self-adjusting intelligent closed loop feedback of parameters.

In S3, the leakage current edge monitoring terminal uses the same pseudo-leakage compensation model as the power consumption management cloud platform and processes the leakage current data according to the pseudo-leakage compensation model parameters received from the power consumption management cloud platform, so as to eliminate the influence of a pseudo-leakage phenomenon in the leakage current data. It can be understood that the leakage current data is different from the historical data used during the training of the power consumption management cloud platform, that is, the leakage current data is the newly collected leakage current data.

Figure 2:
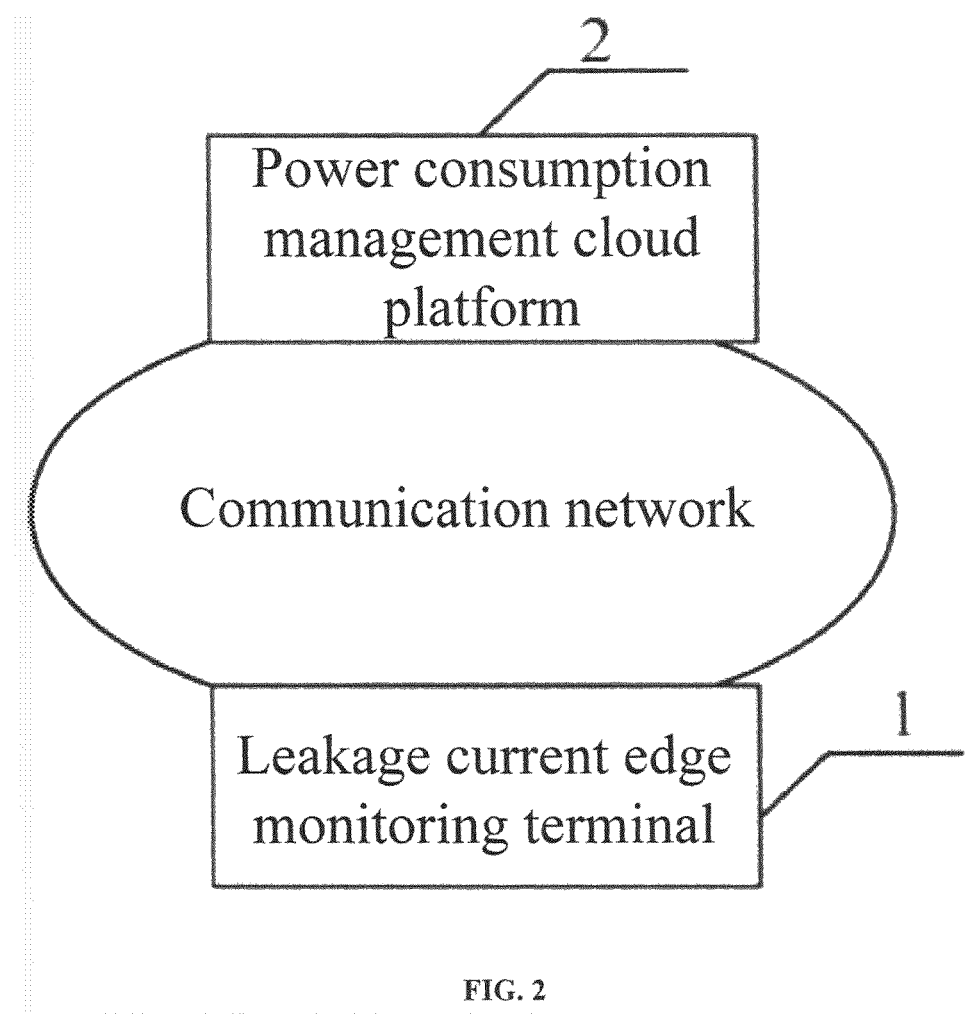
FIG. 2 is a schematic structural diagram of a leakage measurement error compensation system based on cloud-edge collaborative computing provided by the embodiments of the present disclosure.

As shown in FIG. 2, a leakage measurement error compensation system based on cloud-edge collaborative computing provided in the embodiments of the present disclosure includes a leakage current edge monitoring terminal 1 and a power consumption management cloud platform 2 which are interconnected, where the leakage current edge monitoring terminal 1 is used to monitor load voltage, load current and leakage current data and send the data to the power consumption management cloud platform 2, and uses the same pseudo-leakage compensation model as the power consumption management cloud platform 2 and receives the pseudo-leakage compensation model parameters fed back by the power consumption management cloud platform 2 to process the leakage current data, so as to eliminate the influence of a pseudo-leakage phenomenon in the leakage current data; and the power consumption management cloud platform 2 uses the received data to iteratively train the pseudo-leakage compensation model to obtain pseudo-leakage model parameters, and feeds the pseudo-leakage model parameters back to the leakage current edge monitoring terminal 1.

The load voltage, load current and leakage current data are collected by a preset sensor from designated circuit nodes.

The pseudo-leakage compensation model is constructed by an MIR algorithm based on RFC, and center points and covariances of fuzzy members are gradually optimized in a training process until probabilistic members complete the convergence.

Figure 3:
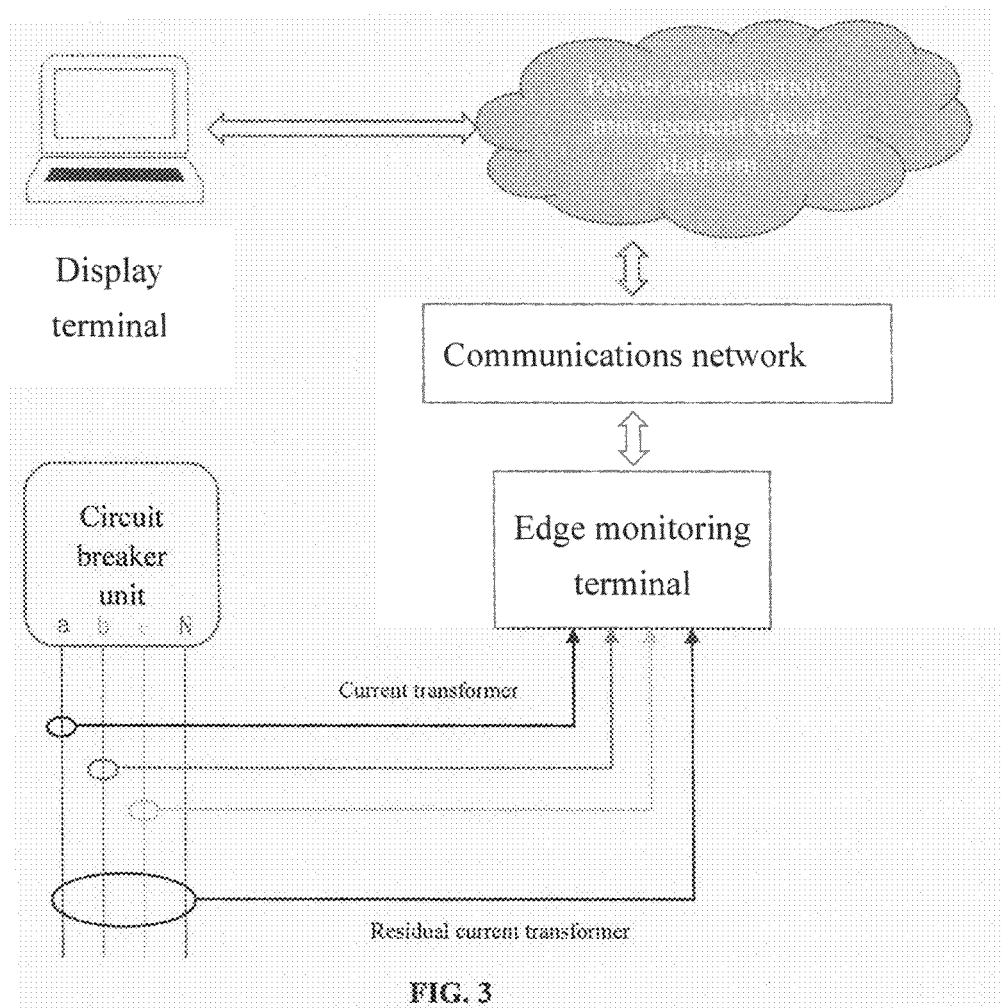
FIG. 3 is an architecture diagram of a leakage measurement error compensation system based on cloud-edge collaborative computing provided by the embodiments of the present disclosure.

FIG. 3 is an architecture diagram of a leakage measurement error compensation system based on cloud-edge collaborative computing. The system operation process is as follows:

(1) the edge monitoring terminal monitors the load current, leakage current and load voltage data of a phase a, a phase b and a phase c collected by preset sensors such as a current transformer, a residual current transformer and a voltage sensor on circuit breaker unit line nodes (note: in the figure, a, b and c represent electrical interface terminals of the phase a, the phase b and the phase c respectively, an N pole represents a neutral line interface terminal, the current transformer is configured to obtain the current of the phase a, the phase b and the phase c respectively, and the residual current transformer is configured to obtain the leakage current on the entire circuit breaker unit line nodes);

(2) the data collected by the monitoring terminal is sent to the power consumption management cloud platform through a communication network, and at the same time, the collected data can be visualized to a display terminal;

(3) the power consumption management cloud platform uses the received data to iteratively train a pseudo-leakage compensation model, updates pseudo-leakage model parameters, and feeds the pseudo-leakage model parameters back to the leakage current edge monitoring terminal; and (4) the leakage current edge monitoring terminal uses the same pseudo-leakage compensation model as the power consumption management cloud platform and processes the leakage current data according to the pseudo-leakage compensation model parameters received from the power consumption management cloud platform, so as to eliminate the influence of a pseudo-leakage phenomenon in the leakage current data.

Figure 4:
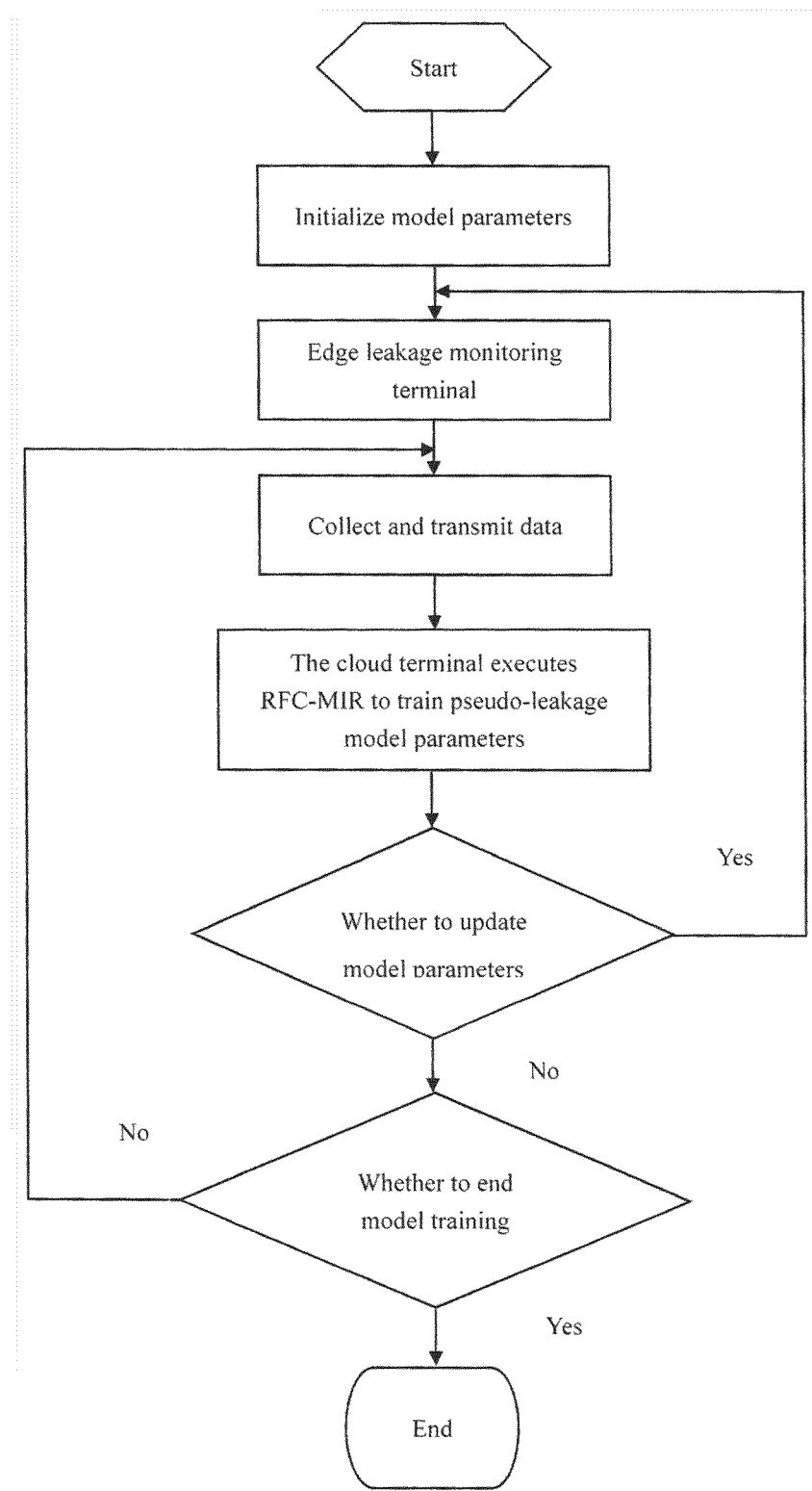
FIG. 4 is a flowchart of model parameter training and updating for pseudo-leakage elimination by cloud-edge collaborative computing provided by the embodiments of the present disclosure.

FIG. 4 is a flowchart of model parameter training and updating for pseudo-leakage elimination by cloud-edge collaborative computing. Model optimization training steps are as follows:

first, model parameters of the edge monitoring terminal are initialized;

the monitoring terminal at the edge obtains data such as phase a current, phase b current, phase c current, leakage current and voltage in the current circuit breaker unit line node, and uploads the data to a cloud terminal;

a cloud server executes RFC-MIR after accumulating the leakage current data for a period of time to obtain a regression equation of the "pseudo-leakage" current, and when the model parameters are optimized compared with the previous stage, the parameters are downloaded to the corresponding monitoring terminal, and a new parameter model is used to process the monitoring data;

the monitoring terminal removes the "pseudo-leakage" interference from the newly collected data; and steps 2-4 are repeated to iteratively update the regression equation of the "pseudo-leakage" current.

Figure 5:
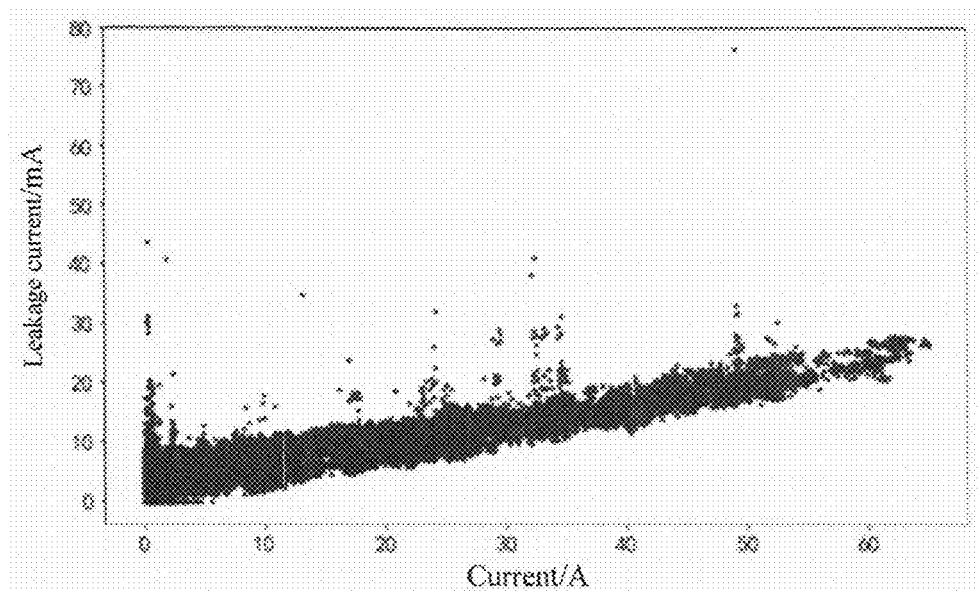
FIG. 5 is a diagram showing the corresponding relationship between the leakage current and the current before the leakage measurement error compensation provided by the embodiments of the present disclosure.
Figure 6:
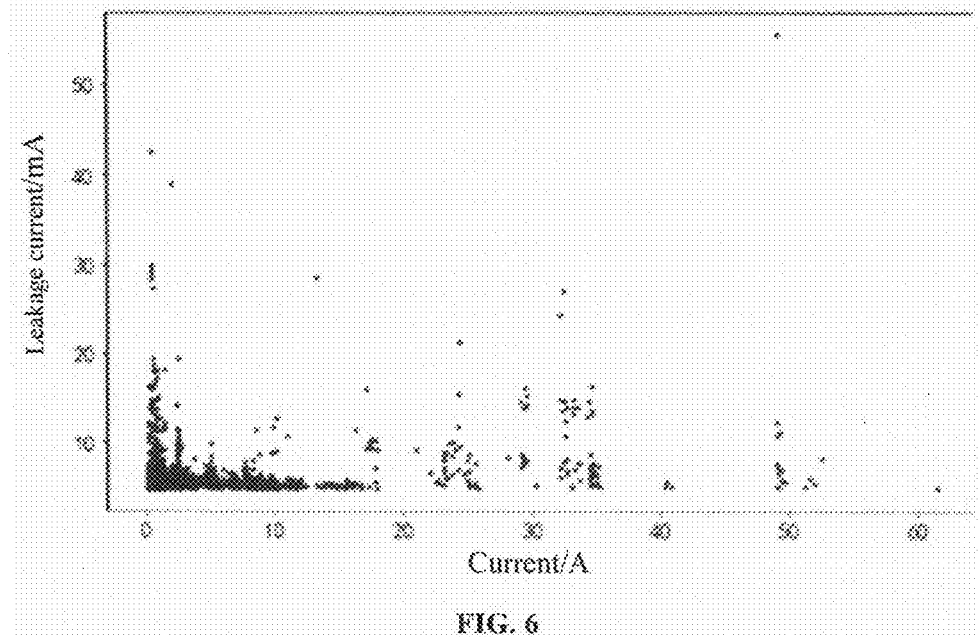
FIG. 6 is a diagram showing the corresponding relationship between the real leakage current and the current after the leakage measurement error compensation provided by the embodiments of the present disclosure.

FIG. 5 is a diagram showing the corresponding relationship between the leakage current and the current before the leakage measurement error compensation (that is, before elimination of pseudo-leakage). FIG. 6 is a diagram showing the corresponding relationship between the real leakage current and the current after the leakage measurement error compensation (that is, after elimination of pseudo-leakage). By comparing the results before and after the leakage measurement error compensation, the reliability of the leakage measurement error compensation method based on cloud-edge collaborative computing provided by the present disclosure is verified.

The embodiments of the present disclosure have the following beneficial effects:

Based on an original storage function of the power consumption management cloud platform, the present disclosure focuses on solving the construction and training problems of complicated models, and model parameter updates are provided for edge computing and fed back to the leakage current edge monitoring terminal, thereby realizing self-adaptive and self-adjusting intelligent closed loop feedback of parameters. As a result, the leakage current edge monitoring terminal processes the data collected by the zero sequence current transformer according to the pseudo-leakage model parameters to complete edge computing compensation, so as to eliminate the influence of a pseudo-leakage phenomenon on a real leakage current, thereby achieving the purpose of eliminating the pseudo-leakage phenomenon generated by the zero sequence current transformer to obtain accurate leakage current data.

It should be noted that the units included in the above embodiments of the system are merely divided based on functional logic, but are not limited to the foregoing division, as long as the corresponding functions can be implemented. In addition, specific names of the functional units are merely for the convenience of distinguishing from each other, and are not used to limit the protection scope of the present disclosure.

Those of ordinary skill in the art can understand that all or some of the steps in the method of the above embodiment may be implemented by instructing related hardware by using a program. The program may be stored in a computer-readable storage medium. The storage medium may be a read-only memory (ROM)/random access memory (RAM), a disk, a compact disc, or the like.

The above disclosure is only a preferred embodiment of the present disclosure, and is not intended to limit the claimed scope of the present disclosure. Therefore, equivalent changes made according to the claims of the present disclosure are still within the scope of the present disclosure.

What is claimed is:

1. A leakage measurement error compensation method based on cloud-edge collaborative computing, implemented on a communication network formed by interconnection between a leakage current edge monitoring terminal and a power consumption management cloud platform, and comprising the following steps:

monitoring, by the leakage current edge monitoring terminal, load voltage, load current and leakage current data, and sending the data to the power consumption management cloud platform;

iteratively training, by the power consumption management cloud platform, a pseudo-leakage compensation model by using the received data, updating pseudo-leakage model parameters, and feeding the pseudo-leakage model parameters back to the leakage current edge monitoring terminal; and processing, by the leakage current edge monitoring terminal, the leakage current data according to the pseudo-leakage compensation model parameters received from the power consumption management cloud platform and by using the same pseudo-leakage compensation model as the power consumption management cloud platform, so as to eliminate the influence of a pseudo-leakage phenomenon in the leakage current data in real time;

wherein the pseudo-leakage compensation model is constructed by a Multiple Instance Regression (MIR) algorithm based on Robust Fuzzy Clustering (RFC), and center points and covariances of fuzzy members are gradually optimized in a training process until probabilistic members complete the convergence;

wherein an optimization formula of the fuzzy members is:

$$u_{ij}^F = \left[\sum_{k=1}^{C}\left(\frac{dist_{ij}^2}{dist_{kj}^2}\right)^{\frac{1}{m-1}}\right] - 1,$$

wherein $$u_{ij}^F \in [0,1]; \sum_{i=1}^{C} u_{ij}^F = 1; dist_{ij}^2 = \sum_{k=1}^{d+1} v_{ik}[(x_j - c_i) \cdot e_{ik}]^2;$$

C represents a number of clusters; m>1, and represents a fuzzy weight parameter; $x_j$ represents a sample; $c_i$ represents a center of a cluster i; $e_{ik}$ represents a kth characteristic vector of a covariance matrix $$\Sigma_i = \frac{\sum_{j=1}^{N}(u_{ij}^F)^m (x_j - c_i)(x_j - c_i)^T}{\sum_{j=1}^{N}(u_{ij}^F)^m}$$

of the cluster i; and $v_{ik}$ represents a weight coefficient of a characteristic root in the kth characteristic vector.

2. The leakage measurement error compensation method based on cloud-edge collaborative computing according to claim 1, wherein the load voltage, load current and leakage current data are collected by a preset sensor from designated circuit nodes.

3. The leakage measurement error compensation method based on cloud-edge collaborative computing according to claim 1, wherein an updating formula of the probabilistic members is:

$$u_{ij}^P = \frac{1}{1 + \left(\frac{dist_{ij}^2}{\eta_i}\right)^{\frac{1}{m-1}}}.$$

4. A leakage measurement error compensation system based on cloud-edge collaborative computing, comprising a leakage current edge monitoring terminal and a power consumption management cloud platform which are interconnected, wherein the leakage current edge monitoring terminal is used to monitor leakage current data and send the leakage current data to the power consumption management cloud platform, and uses the same pseudo-leakage compensation model as the power consumption management cloud platform and processes the leakage current data according to the pseudo-leakage compensation model parameters received from the power consumption management cloud platform, so as to eliminate the influence of a pseudo-leakage phenomenon in the leakage current data; and the power consumption management cloud platform uses the received leakage current data to iteratively train a pseudo-leakage compensation model, updates pseudo-leakage model parameters, and feeds the pseudo-leakage model parameters back to the leakage current edge monitoring terminal;

wherein the pseudo-leakage compensation model is constructed by a Multiple Instance Regression (MIR) algorithm based on Robust Fuzzy Clustering (RFC), and center points and covariances of fuzzy members are gradually optimized in a training process until probabilistic members complete the convergence;

wherein an optimization formula of the fuzzy members is:

$$u_{ij}^F = \left[\sum_{k=1}^{C}\left(\frac{dist_{ij}^2}{dist_{kj}^2}\right)^{\frac{1}{m-1}}\right] - 1,$$

wherein $$u_{ij}^F \in [0,1]; \sum_{i=1}^{C} u_{ij}^F = 1; dist_{ij}^2 = \sum_{k=1}^{d+1} v_{ik}[(x_j - c_i) \cdot e_{ik}]^2;$$

C represents a number of clusters; m>1, and represents a fuzzy weight parameter; $x_j$ represents a sample; $c_i$ represents a center of a cluster i; $e_{ik}$ represents a kth characteristic vector of a covariance matrix $$\Sigma_i = \frac{\sum_{j=1}^{N}(u_{ij}^F)^m (x_j - c_i)(x_j - c_i)^T}{\sum_{j=1}^{N}(u_{ij}^F)^m}$$

of the cluster i; and $v_{ik}$ represents a weight coefficient of a characteristic root in the kth characteristic vector.

5. The leakage measurement error compensation system based on cloud-edge collaborative computing according to claim 4, wherein the load voltage, load current and leakage current data are collected by a preset sensor from designated circuit nodes.

* * * * *